UNITED STATES PATENT OFFICE.

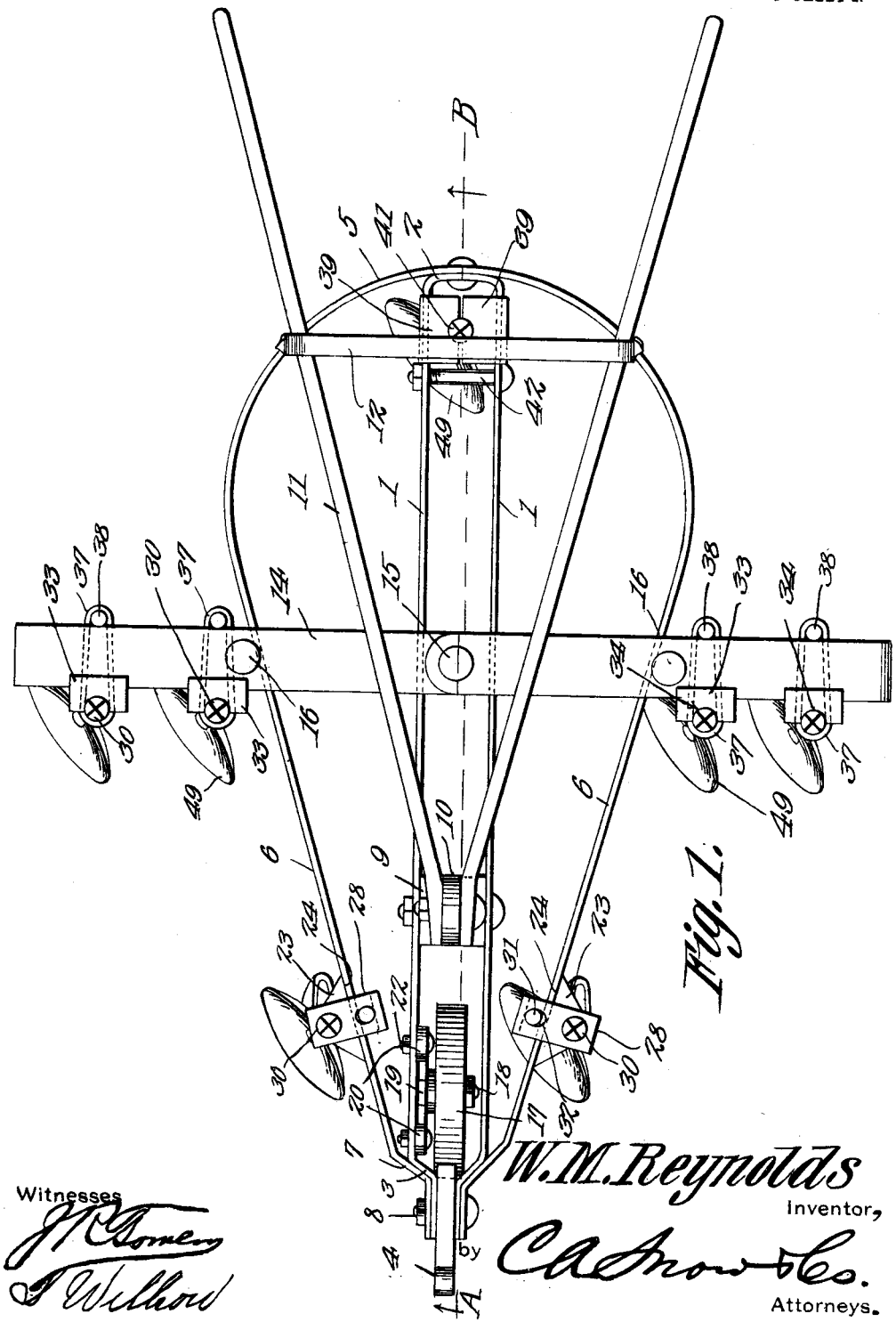

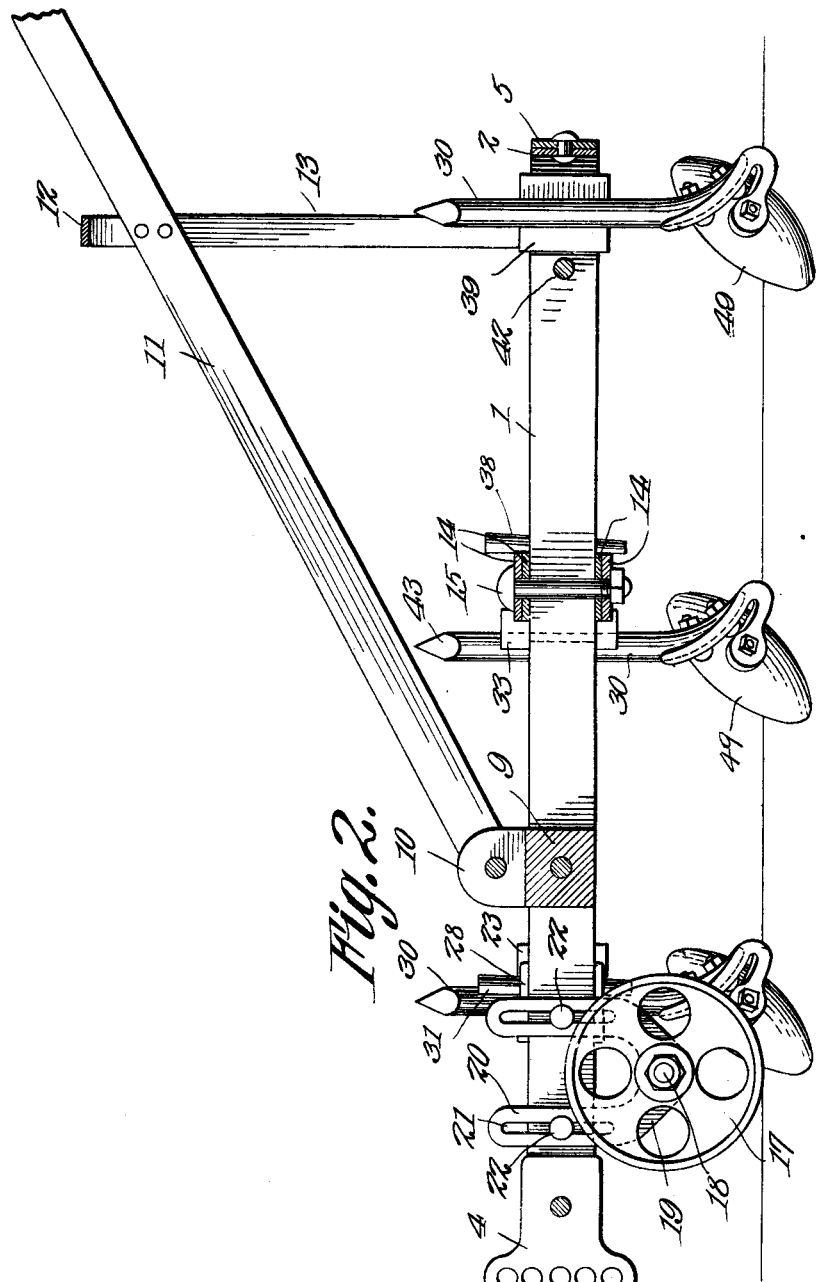

WALTER M. REYNOLDS, OF HATTIESBURG, MISSISSIPPI, ASSIGNOR OF ONE-HALF TO MARCUS C. VANDERFORD, OF HATTIESBURG, MISSISSIPPI.

CULTIVATOR.

1,131,957.      Specification of Letters Patent.      Patented Mar. 16, 1915.

Application filed April 25, 1914. Serial No. 834,444.

*To all whom it may concern:*

Be it known that I, WALTER M. REYNOLDS, a citizen of the United States, residing at Hattiesburg, in the county of Forest and State of Mississippi, have invented a new and useful Cultivator, of which the following is a specification.

This invention relates to cultivators, one of its objects being to provide means whereby the structure can be converted readily from a toothed cultivator to a disk cultivator, the shank employed for holding a cultivator blade or shovel being also employed for connecting a disk to the cultivator structure.

A further object is to provide improved means for connecting the soil engaging elements adjustably to the main structure of the cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a cultivator having disk soil engaging elements. Fig. 2 is a central vertical longitudinal section on line A—B Fig. 1.

Referring to the figures by characters of reference 1 designates parallel central beams preferably formed of one piece or strip of metal folded at its center, as at 2, the terminals of said strip being offset toward each other, as at 3 so as to receive between them and be bolted or otherwise secured to a clevis 4. Secured to the portion 2 is a bowed frame member 5 merging into forwardly converging side members 6, the front ends or terminals of which are offset inwardly as at 7 so as to engage the sides of the offset portions 3 and to be secured thereto by the same bolt 8 which is used for attaching the offset portion 3 to the clevis 4.

A block 9 is interposed between the central beams 1 and has an upstanding ear 10 to the sides of which are secured upwardly and rearwardly converging handles 11 which may be provided with a cross brace 12. This brace can be formed of metal and can be made integral with standards 13 secured in any suitable manner to the bowed portion 5 of the frame.

Extending above and below the beams 1 and the side portions 6 are upper and lower arms 14, the upper arms lapping at their inner ends and the lower arms also lapping at their inner ends, as shown particularly in Fig. 2, these lapping portions having a combined pivot and clamping bolt 15 extended through them and between the beams 1. By loosening the bolt the arms 14 can be moved to any desired positions upon the beams 1 and side portions 6 and can be adjusted angularly relative to each other after which, by tightening the bolt 15, the parts can be held against movement relative to each other. Additional clamping bolts 16 can be extended through the upper and lower arms 14 beyond the outer sides of the portions 6 and by tightening these bolts 16 the arms 14 can be caused to bind upon the side portions 6, thus to assist the bolt 15 in holding the arms 14 against relative movement.

If desired, and as shown particularly in Fig. 2, a wheel 17 can be located between the front portions of the beams 1, this wheel being journaled on a stud 18 extending laterally from a plate 19. Arms 20 extend upwardly from the plate and are provided with longitudinal slots 21 for the reception of clamping bolts 22 extending through one of the beams 1. By means of these bolts and the slots, the wheel 17 can be adjusted upwardly or downwardly relative to the beams 1, thus to regulate the depth of the cut produced by the soil engaging devices hereinafter described.

The side portions 6 of the main structure are adapted to carry a desired number of holding devices whereby soil engaging devices may be secured in place. The holding devices to be carried by these side members 6 are constructed as shown in Fig. 5. Each of these holding devices includes a block 23 having a broad flat surface 24 designed to bear against the outer side of the portion 6 and a substantially vertical groove 25 in its outer portion. The upper and lower ends of the block are engaged by the upper and lower arms 27 of a U-shaped tie device 28 which straddles the side portion 6. Openings 29 are formed in the arms 27 and are adapted to register with the groove 25 so as thus to receive a shank 30 resting in the groove 25. A tapered holding pin 31 is insertible into openings 32 formed in the arms 27, this pin being adapted to enter back of the side portion 6 so that, when the pin is driven downwardly, it will act as a wedge and bind the block 23 tightly upon the outer surface of the side portion 6 and at the same time cause the forward portions of the walls of openings 29 to clamp upon the shank 30 and hold it securely within the groove 25.

The arms 14 are provided with holders of a different pattern and which have been illustrated in Fig. 6. Each of these holders includes a block 33 having a substantially vertical groove 34 in one face while heads 35 are formed at the upper and lower ends of the blocks and adapted to lap the upper and lower faces respectively of the upper and lower arms 14. A tongue 36 extends rearwardly from the block and into the space between the arms 14. A loop 37 formed preferably of sheet metal extends around the block 34 and between the heads 35, this loop being extended between the arms 14 and projecting rearwardly therebeyond. A wedging pin 38 is adapted to be inserted into the rearwardly projecting portion of the loop and a standard 30 is adapted to be placed between the forwardly extending portion of the loop and the block 33, this standard or shank 30 resting in the groove 34. It is to be understood that any desired number of these holders may be mounted on the arms 14.

For the purpose of holding a shank or standard between the beams 1, holding means such as shown particularly in Figs. 3 and 4 is employed. This holding means includes opposed blocks 39 each of which has a transverse groove in its outer face for the reception of one of the beams 1. Substantially vertical grooves 41 are formed within the inner faces of the blocks and are designed to register, these grooves being designed to receive a shank or standard 30. A bolt 42 is extended transversely through the beams 1 close to the blocks 39, as shown in Fig. 1 and by tightening this bolt 42, the blocks can be caused to bind tightly upon a shank 30 inserted between them.

As shown in the drawings, each shank or standard 30 may be provided with a soil engaging element such as a disk 49.

Obviously the relative positions of the shanks or standards can be varied at will in order that the desired action upon the soil may be had. The blocks 39 can be adjusted either up to the front or to the rear portions of the beams 1, the arms 14 can be adjusted angularly about the bolt 15, the holders 33 can be adjusted toward or from each other so as to bring the shanks to any desired distances apart, and the holders 24 can be adjusted to any desired positions along the side portions 6 of the frame. Furthermore if desired, the shanks 30 can be inverted so that the points 43 thereof can be used as harrow teeth.

What is claimed is:—

1. A cultivator including parallel central beams, rearwardly diverging side members merging at their rear ends into an arcuate portion, said arcuate portion being connected to the rear ends of the central beams and said side portions being connected at their front ends to the front ends of the central beams, oppositely extending pairs of arms, the beams and side portions being extended between the arms of the pairs, said pairs being pivotally connected, means for binding the arms upon the beams and side portions of the frame, and soil engaging devices carried by said side portions, arms and beams.

2. A cultivator including a frame made up of central beams, an arcuate portion secured to the rear ends of the beams and merging into forwardly converging side portions, the front ends of the side portions and of the beams being secured together, arms pivotally connected and arranged above and below the frame, said arms being disposed in pairs and adjustable angularly relative to each other and adjustable bodily relative to the frame, means for binding the arms upon the frame to hold them against movement relative to each other and to the frame, shanks, separate means for frictionally engaging the shanks and for holding them frictionally upon the side portions, arms and central beams respectively.

3. A cultivator including a frame made up of central beams, an arcuate portion secured to the rear ends of the beams and merging into forwardly converging side portions, said side portions and beams being secured together at their front ends, a grooved block engaging a portion of the frame, a shank engaging the block, means engaging the shank for holding it upon the block, and means engaging the frame and said holding means for binding the shank upon the block and to bind the block upon the frame.

4. A cultivator including a frame, said frame including central beams, a rear arcuate portion secured to the rear ends thereof and merging into forwardly converging side portions, and adjustable arms carried by the beams and side portions, and blocks frictionally engaging the frame, shanks engaging the respective blocks, and means engaging the frame for binding the shanks upon said blocks to hold the shanks against movement relative to the blocks and to hold the blocks against movement relative to the frame.

In testimony that I claim the foregoing as my own, I have hereto affixed my signature in the presence of two witnesses.

WALTER M. REYNOLDS.

Witnesses:
JAMES S. LEA,
G. W. KAMPER.